Figure 1:
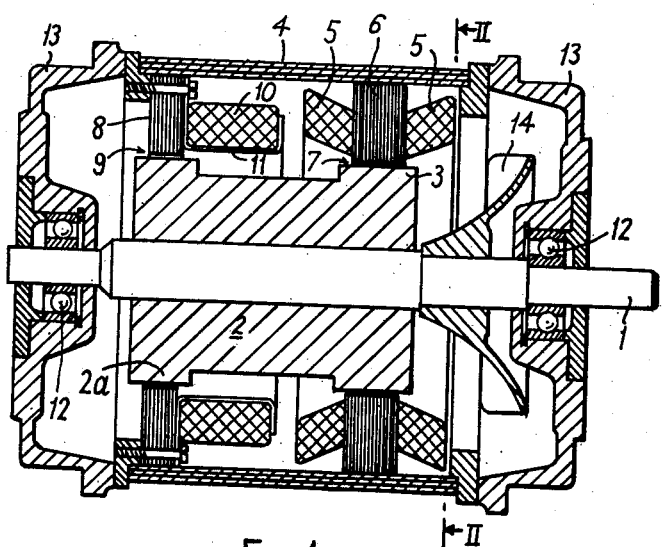

May 4, 1965

N. R. BANCROFT 3,182,216

ELECTRIC ALTERNATORS INCLUDING BASKET
WINDINGS LOCATED IN THE AIR GAP

Filed Jan. 12, 1961

3 Sheets-Sheet 1

Inventor
N. R. Bancroft
By
Attorneys

3,182,216
ELECTRIC ALTERNATORS INCLUDING BASKET WINDINGS LOCATED IN THE AIR GAP
Norman R. Bancroft, Cambridge, England, assignor to Pye Limited, Cambridge, England, a British company
Filed Jan. 12, 1961, Ser. No. 82,266
Claims priority, application Great Britain, Jan. 18, 1960, 1,716/60
2 Claims. (Cl. 310—168)

The present invention relates to electric alternators for generating A.C. voltages.

According to one aspect, the invention consists in an electric alternator comprising a rotor of magnetic material having a plurality of pole pieces positioned axially towards one end of the rotor, said pole pieces being equi-spaced around the rotor and projecting towards a stator, said stator being made of magnetic material and arranged coaxial with the rotor, a winding or windings in which an A.C. voltage is to be generated arranged opposite the pole pieces and fixed relative to the stator, said winding or windings extending all round the stator, and a member of magnetic material extending between the stator and the rotor and axially spaced along the rotor from the pole pieces.

The invention also consists in an electric alternator comprising a rotor consisting of a generally cylindrical core of magnetic material carrying a plurality of equi-spaced radially outwardly extending pole pieces positioned axially towards one end of the rotor, a stator member of magnetic material coaxial with and surrounding the rotor and carrying, opposite the pole pieces, a winding or windings in which an A.C. voltage is to be generated, said winding or windings extending all around the stator, an annular member of magnetic material extending between the rotor and the stator and surrounding a part of the rotor spaced axially from the pole pieces and an energising winding associated with said annular member.

The stator preferably consists of a cylindrical member formed by a stack of concentric laminations and may be constructed as described in our copending application Serial No. 2,626 filed January 15, 1960, whilst the rotor preferably consists of a cylinder of magnetic iron. The member of magnetic material extending between the rotor and stator advantageously consists of a stack of annular disc-like laminations.

According to one construction, the winding or windings in which the A.C. voltage is to be generated are either carried by insulating material or are self-supporting and are arranged in a gap between the tips of the pole pieces and the stator member, opposite the pole pieces. The winding or windings may be formed by a printed circuit technique on a flexible insulating material which is then wound into annular form and secured to the stator member opposite the pole pieces. Alternatively the winding or windings can be formed of solid copper conductors which can either be self-supporting or else embedded in an insulating material to form an annular winding assembly which again is secured to the stator opposite the pole pieces. With such a construction the pole pieces may consist of a stack of laminations with the individual laminations lying in a plane normal to the axis of rotation of the rotor. The pole pieces preferably have appreciable depth in the radial direction because of the comparatively large air gap introduced into the magnetic circuit with this construction and are outwardly flared towards the tips to achieve a substantially sinusoidal distribution of flux and therefore provide a substantially sinusoidal output waveform.

In another construction, the winding or windings in which the A.C. voltage is to be generated are arranged in slots in a stack of laminations carried from the stator. The pole pieces may be fairly shallow in the radial direction and may be non-laminated.

The pole pieces are shaped according to the type of A.C. waveform which it is desired to generate in the winding or windings. The pole pieces may also be skewed in the axial direction of the machine to improve the shape of the generated waveform.

Figure 2:
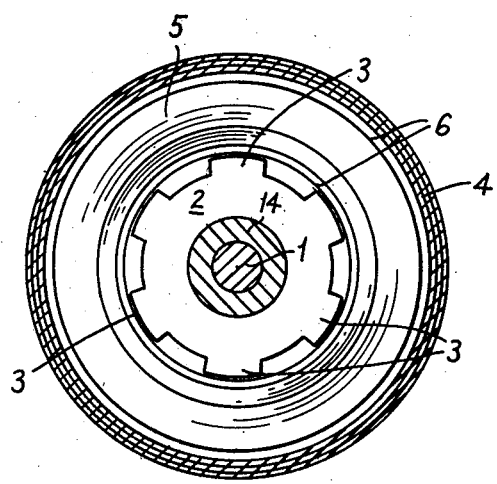
Figure 3:
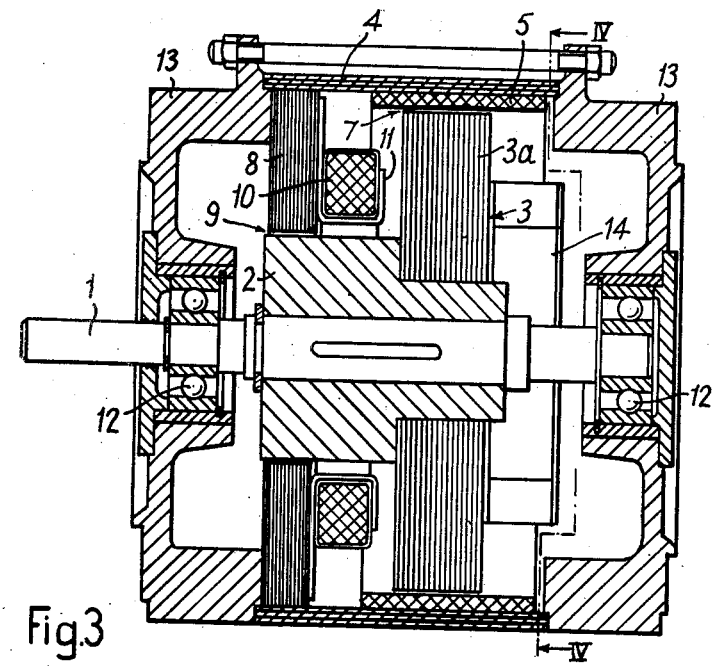
Figure 4:
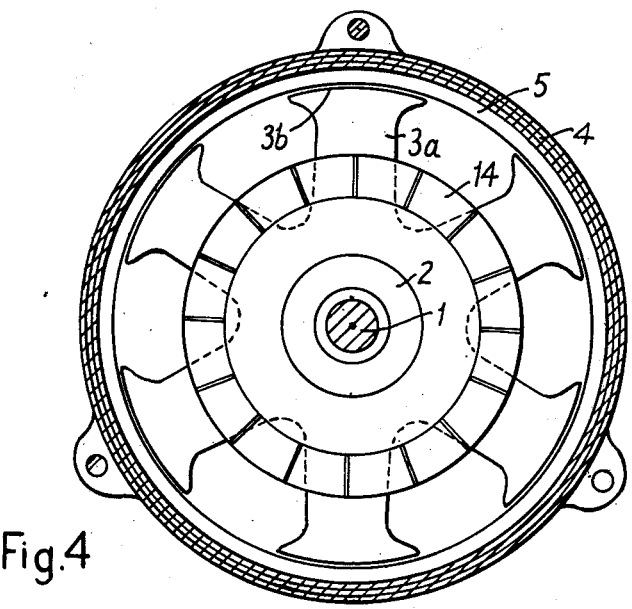
Figure 5:
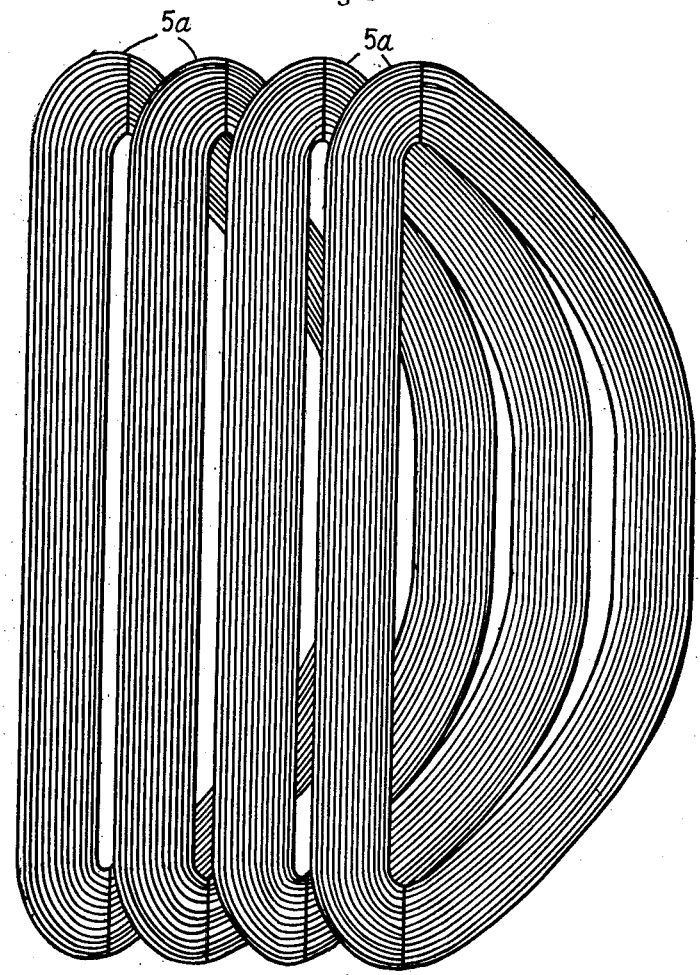
Figure 6:

In order that the invention may be more fully understood some embodiments thereof will now be described with reference to the accompanying drawings, in which:

FIGURE 1 is an axial section through one construction of electric alternator according to the invention, FIGURE 2 is an end section on the line II—II in FIGURE 1, FIGURE 3 is an axial section through another construction of electric alternator according to the invention, FIGURE 4 is an en end section on the line IV—IV in FIGURE 3, and FIGURES 5 and 6 are respectively a plan view and an end view, on a larger scale, of a portion of one form of stator winding as may be employed in the alternator of FIGURES 3 and 4.

Referring to FIGURES 1 and 2, the alternator comprises a shaft 1 carrying a cylindrical rotor core 2 of magnetic iron, at one end of which is formed a plurality of shallow radially outwardly extending solid pole pieces 3. These poles may either be formed with the rotor as a casting, or formed by cutting slots in the enlarged end of the rotor. The other enlarged end 2a of the rotor, remote from the pole pieces, is cylindrical. The stator consists of a cylindrical member 4 which also forms the casing ring of the machine and is constructed of a plurality of concentric laminations extending axially of the stator. The winding or windings 5 in which the A.C. voltage is to be generated and which may be either single phase or multi-phase, are arranged in slots in an annular laminated iron member 6 welded within the stator ring opposite the pole pieces 3 and separated therefrom by a small air gap 7. An annular member 8 of magnetic material consisting of a stack of iron laminations extends between the stator ring 4 and the rotor 2 and is axially spaced from the pole pieces 3. A small annular air gap 9 exists between the member 8 and adjacent end of the rotor 3. An annular excitation coil 10 is suspended by means of clips 11 from the magnetic member 8. The shaft 1 carrying the rotor is mounted in bearings 12 housed in end covers 13 of non-magnetic material which with the stator 4 complete the casing of the machine. A cooling fan 14 is also mounted on the shaft 1 for rotation with it.

The operation of the alternator will now be described.

When the excitation coil 10 is energized from a D.C. supply, a steady toroidal magnetic field is set up around the coil and the associated iron circuit. The field passes down the lamination stack 8, along the rotor core 2, up the pole pieces, across the air-gap 7, through the stator laminations 6, and along the casing ring 4 to complete the magnetic circuit. A reversal of the polarity of the D.C. excitation supply will reverse the direction of the magnetic flux in the circuit but will not affect the action of the alternator.

By reason of the poles 3, the magnetic flux in the air-gap 7 is broken into sections. The flux distribution is substantially uniform over the pole faces, and the poles are skewed in the axial direction to produce a sinusoidal output waveform.

If the shaft 1 is rotated, the magnetic field associated with the poles 3 also rotates, and the A.C. winding or windings 5 are acted upon by a pulsating unidirectional magnetic field, the amplitude of pulsation being of sinusoidal form. The frequency is determined by the speed of the shaft and the number of pole pieces 3 on the rotor. The resultant induced alternating potential in the winding or windings can be made of substantially sinusoidal form.

The amplitude of the induced voltage is controlled by the current applied to the D.C. excitation coil 10. The machine can be made self-exciting in a similar manner to a D.C. generator, by supplying the excitation coil 10 from the A.C. winding via a suitable rectifier.

In the embodiment of FIGURES 3 and 4 the alternator generally comprises similar parts to those in the embodiment of FIGURES 1 and 2, and corresponding parts have been given the same reference numerals. However in this embodiment the pole pieces consist of a stack of magnetic iron laminations 3a arranged at one end of the rotor 2 and extend outwardly towards the stator member but are spaced therefrom by a gap in which is contained the winding or windings 5 in which the A.C. voltage is to be generated. The pole pieces have appreciable depth in the radial direction to reduce flux leakage between the poles and are flared out circumferentially adjacent their tips 3b so as to produce a sinusoidal variation of flux density around the gap. In this embodiment a basket winding is employed formed of individual bonded coils 5a, a few of which are shown in FIGURES 5 and 6. As can be seen in these figures, the coils are shaped to interleave in a two layer formation. The coils are wound and bonded individually and are then built up to form a complete assembly which is held in position within the casing ring and then bonded to form a unit. Although the coils in FIGURE 6 have been shown as extending in a line, it will be appreciated that in practice the complete assembly of coils is curved to conform to the inside of the stator or casing ring when they are positioned within it. The coils may be wound from a thermoplastic covered wire so that bonding of the individual coils and of the coil assembly can be effected by passing a sufficient current through the wire to soften the thermoplastic to cause adjacent layers to adhere together. The assembled stator winding may be embedded in an insulating material such as an epoxy resin.

In view of the fact that the winding or windings are in effect arranged in an air gap and not embedded in magnetic material they are located in a substantially uniform rotating magnetic field and not in a pulsating field as in the preceding embodiment. Moreover the copper losses are reduced and the energising coil has a shorter time constant. An improved output power/weight ratio can be obtained with this type of winding and almost a pure sine waveform can be generated because there are no laminations or other interfering iron work with non-linear characteristics immediately in the vicinity of the windings. The waveform will however depend upon the pole shape. Alternatively the winding or windings may be formed by a printed circuit process on a flexible insulating material which is wound round to form an annular member which is secured within the stator, for example by means of rivets, screws or a suitable adhesive.

The machines according to the present invention possess the advantage that they do not employ any rotating windings and hence do not need to employ slip rings or brushes. Moreover the cost is considerably less than wound rotor alternators whilst maintaining an efficiency and a power gain at least as high as with existing constructions. Furthermore a useful output can be obtained from the machine at low speeds of rotation so that the machine is suitable for use as a tachometer generator.

Whilst particular embodiments have been described it will be understood that various modifications may be made without departing from the scope of this invention. For example, the number of poles on the rotor may be varied from two upwards depending upon the output that is desired from the machine and the speed of rotation at which it is to be driven. Moreover the machine can be constructed as double-ended, that is to say, with poles at both ends of a rotor and two sets of windings, one each side of the field coil. The machine may also be used as a synchronous motor.

I claim:

1. An electric alternator comprising a rotor consisting of a generally cylindrical core of magnetic material carrying a plurality of equi-spaced radially outwardly extending pole pieces positioned axially towards one end of the rotor, an axially laminated stator member comprising a plurality of annular concentric lamination rings of magnetic material coaxial with and surrounding the rotor to define an air gap therebetween, said stator having an internal surface free from polar projections, at least one self-supporting winding in which an A.C. voltage is to be generated arranged opposite the pole pieces, said at least one self-supporting winding extending all round the stator, a laminated annular member of magnetic material comprising a stack of annular disc-like laminations extending between the rotor and the stator and surrounding a part of the rotor spaced axially from the pole pieces, an energising winding associated with said annular member and means for suspending the energising winding from the annular member.

2. An electric alternator comprising a rotor consisting of a generally cylindrical core of magnetic material carrying a plurality of equi-spaced radially outwardly extending pole pieces positioned axially towards one end of the rotor, said pole pieces flaring outwardly towards their tips, an axially laminated stator member comprising a plurality of annular concentric lamination rings of magnetic material coaxial with and surrounding the rotor to define an air gap therebetween, said stator having an internal surface free from polar projections, at least one self-supporting winding in which an A.C. voltage is to be generated arranged opposite the pole pieces, said at least one self-supporting winding extending all round the stator, and comprising a plurality of coils which are interleaved together to form a basket winding, a laminated annular member of magnetic material comprising a stack of annular disc-like laminations extending between the rotor and the stator and surrounding a part of the rotor spaced axially from the pole pieces, an energising winding associated with said annular member and means for supporting the energising winding from the annular member.

References Cited by the Examiner

UNITED STATES PATENTS

| | | | |
|---|---|---|---|
| 529,918 | 11/94 | Kelly | 310—168 |
| 594,145 | 11/97 | Steinmetz | 310—168 |
| 644,995 | 3/00 | Moore | 310—168 |
| 1,255,606 | 2/18 | Hensley | 310—216 |
| 2,695,371 | 11/54 | Barnes | 310—168 |
| 2,764,802 | 10/56 | Fieretag | 310—258 |
| 2,993,135 | 7/61 | Bandot. | |

OTHER REFERENCES

Alternating Current Armature Windings, by Siskind, 1951, first edition (McGraw-Hill Book Company).

MILTON O. HIRSHFIELD, *Primary Examiner*,

ORIS L. RADER, *Examiner*.